(12) United States Patent
Seibel, II et al.

(10) Patent No.: US 8,589,120 B2
(45) Date of Patent: Nov. 19, 2013

(54) METHODS, SYSTEMS, AND APPARATUS FOR DETERMINING OPTICAL PROPERTIES OF ELEMENTS OF LIGHTING COMPONENTS HAVING SIMILAR COLOR POINTS

(75) Inventors: Harry A. Seibel, II, Morrisville, NC (US); Brian Collins, Holly Springs, NC (US); David Emerson, Chapel Hill, NC (US)

(73) Assignee: Cree, Inc., Durham, NC (US)

( * ) Notice: Subject to any disclaimer, the term of this patent is extended or adjusted under 35 U.S.C. 154(b) by 355 days.

(21) Appl. No.: 13/015,996

(22) Filed: Jan. 28, 2011

(65) Prior Publication Data

US 2012/0197599 A1     Aug. 2, 2012

(51) Int. Cl.
*G06F 15/00*     (2006.01)
*G01J 4/00*     (2006.01)

(52) U.S. Cl.
USPC .......................................... 702/189; 356/367

(58) Field of Classification Search
USPC ....................................................... 702/189
See application file for complete search history.

(56) References Cited

U.S. PATENT DOCUMENTS

| | | | |
|---|---|---|---|
| 4,589,776 A * | 5/1986 | Carver et al. .................. | 356/367 |
| 4,918,497 A | 4/1990 | Edmond | |
| 4,966,862 A | 10/1990 | Edmond | |
| 5,027,168 A | 6/1991 | Edmond | |
| 5,210,051 A | 5/1993 | Carter, Jr. | |
| 5,338,944 A | 8/1994 | Edmond et al. | |
| 5,393,993 A | 2/1995 | Edmond et al. | |
| 5,416,342 A | 5/1995 | Edmond et al. | |
| 5,523,589 A | 6/1996 | Edmond et al. | |
| 5,604,135 A | 2/1997 | Edmond et al. | |
| 5,631,190 A | 5/1997 | Negley | |
| 5,739,554 A | 4/1998 | Edmond et al. | |
| 5,912,477 A | 6/1999 | Negley | |
| 6,120,600 A | 9/2000 | Edmond et al. | |
| 6,187,606 B1 | 2/2001 | Edmond et al. | |
| 6,201,262 B1 | 3/2001 | Edmond et al. | |
| 6,791,119 B2 | 9/2004 | Slater, Jr. et al. | |
| 6,853,010 B2 | 2/2005 | Slater, Jr. et al. | |
| 6,958,497 B2 | 10/2005 | Emerson et al. | |
| 8,170,649 B2 * | 5/2012 | Johansson et al. ............ | 600/476 |
| 2006/0049332 A1 | 3/2006 | Vornsand et al. | |
| 2006/0062108 A1 | 3/2006 | Muthu | |
| 2009/0117672 A1 | 5/2009 | Caruso et al. | |
| 2009/0267484 A1 | 10/2009 | Kasakura et al. | |
| 2009/0309606 A1 | 12/2009 | Tseng et al. | |
| 2010/0256802 A1 | 10/2010 | Garica et al. | |

OTHER PUBLICATIONS

International Search Report Corresponding to International Application No. PCT/US2012/022668; Date of Mailing: May 30, 2012; 15 Pages.

* cited by examiner

*Primary Examiner* — Bryan Bui
(74) *Attorney, Agent, or Firm* — Myers Bigel Sibley & Sajovec (57) ABSTRACT

A method of determining lighting contributions of elements of a lighting component includes obtaining optical data representative of light output of the lighting component. Relative intensity data may be calculated from the optical data, and may indicate intensity differences in the light output of the lighting component as compared to that of a reference component. An optical property of an element of the lighting component is determined based on a comparison of the optical data with that of the reference component, where the reference component includes at least one reference element. Related systems and apparatus are also discussed.

32 Claims, 7 Drawing Sheets

| PARTS | CCX | CCY |
|---|---|---|
| REFERENCE A | 0.4674 | 0.4198 |
| COMPOSITION 1 | 0.4675 | 0.4197 |
| COMPOSITION 2 | 0.4675 | 0.4195 |

| PARTS | CCX | CCY |
|---|---|---|
| REFERENCE B | 0.4676 | 0.4194 |
| COMPOSITION 3 | 0.4672 | 0.4198 |
| COMPOSITION 4 | 0.4676 | 0.4191 |

METHODS, SYSTEMS, AND APPARATUS FOR DETERMINING OPTICAL PROPERTIES OF ELEMENTS OF LIGHTING COMPONENTS HAVING SIMILAR COLOR POINTS

FIELD

The present invention relates to semiconductor light emitting devices, and more particularly, to lighting components including semiconductor light emitting devices.

BACKGROUND

Light emitting diodes and laser diodes are well known solid state lighting elements capable of generating light upon application of a sufficient current. Light emitting diodes and laser diodes may be generally referred to as light emitting devices ("LEDs"). Light emitting devices generally include a p-n junction formed in an epitaxial layer grown on a substrate such as sapphire, silicon, silicon carbide, gallium arsenide and the like. The wavelength distribution of the light generated by the LED generally depends on the material from which the p-n junction is fabricated and the structure of the thin epitaxial layers that make up the active region of the device.

Typically, an LED chip includes a substrate, an n-type epitaxial region formed on the substrate and a p-type epitaxial region formed on the n-type epitaxial region (or vice-versa). In order to facilitate the application of a current to the device, an anode contact may be formed on a p-type region of the device (typically, an exposed p-type epitaxial layer) and a cathode contact may be formed on an n-type region of the device (such as the substrate or an exposed n-type epitaxial layer). When a potential is applied to the ohmic contacts, electrons may be injected into an active region from the n-type layer and holes may be injected into the active region from the p-type layer. The radiative recombination of electrons and holes within the active region generates light. Some LED chips include an active region with multiple light emitting regions or active layers (also known as multi-quantum-well structures) between or near the junction of the n-type and p-type layers.

LEDs may be used in lighting/general illumination applications, for example, as a replacement for conventional incandescent and/or fluorescent lighting. As such, it is often desirable to provide a lighting source that generates white light having a relatively high color rendering index (CRI), so that objects illuminated by the lighting may appear more natural. The color rendering index of a light source is an objective measure of the ability of the light generated by the source to accurately illuminate a broad range of colors. The color rendering index ranges from essentially zero for monochromatic sources to nearly 100 for incandescent sources. Alternatively, it may be desirable to provide a light source that may differ significantly from a light source with a high CRI index, but may still require a tailored spectrum.

In addition, the chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the color or hue of the white light source. White light typically has a CCT of between about 4000 and 8000K. White light with a CCT of 4000 has a yellowish color. White light with a CCT of 8000K is more bluish in color, and may be referred to as "cool white". "Warm white" may be used to describe white light with a CCT of between about 2600K and 6000K, which is more reddish in color.

The light from a single-color LED may be converted to white light by surrounding the LED with a wavelength conversion material, such as a phosphor. The term "phosphor" may be used herein to refer to any materials that absorb light in one wavelength range and re-emit light in a different wavelength range, regardless of the delay between absorption and re-emission and regardless of the wavelengths involved. A fraction of the light may also pass through the phosphor and/or be reemitted from the phosphor at essentially the same wavelength as the incident light, experiencing little or no down-conversion. In general, phosphors absorb light having shorter wavelengths and re-emit light having longer wavelengths. As such, some or all of the light emitted by the LED at a first wavelength may be absorbed by the phosphor particles, which may responsively emit light at a second wavelength. For example, a single blue emitting LED may be surrounded with a yellow phosphor, such as cerium-doped yttrium aluminum garnet (YAG). The resulting light, which is a combination of blue light and yellow light, may appear white to an observer.

However, the use of phosphor-based solid state lighting components for general illumination purposes may present several challenges. For example, the light generated from a phosphor-based solid state lighting component including a blue-emitting LED and a yellow-emitting phosphor may have a relatively low CRI. As such, objects illuminated by the light from such a component may not appear to have natural coloring due to the limited spectrum of the light. While a red phosphor may be included to improve the color rendering, the red-emitting phosphor particles may be subject to greater degradation over time than the yellow-emitting phosphor particles, which may decrease the useful lifetime of the light source. Accordingly, knowledge of the specific contributions of each of the elements (e.g., LED chip, phosphors, encapsulants, etc.) within a lighting source or component to the overall light output may be useful in designing lighting components to provide a desired light output.

SUMMARY

According to some embodiments of the present invention, a method of determining lighting contributions of elements of a lighting component includes obtaining optical data representative of light output of a lighting component including multiple elements. An optical property of an element of the lighting component is determined based on a comparison of the optical data of the lighting component relative to that of a reference component including at least one reference element.

In some embodiments, relative intensity data may be calculated from the optical data of the lighting component. The relative intensity data may be indicative of intensity differences between the light output of the lighting component and that of the reference component, and the comparison may indicate one or more wavelength ranges of the intensity differences.

In some embodiments, the lighting component and the reference component may provide respective light output having a substantially similar color point.

In some embodiments, the element may be a light emitting element, and the optical property may include absorption and/or emission properties of the light emitting element.

In some embodiments, the at least one reference element may be a reference light emitting element having known absorption and/or emission properties.

In some embodiments, the light emitting element of the lighting component may be a wavelength conversion material that is configured to absorb light within a first wavelength range and responsively emit light within a second wavelength range. The wavelength conversion material may not be included in the reference component.

In some embodiments, the reference light emitting element may be a reference conversion material that absorbs and re-emits light over the first and second wavelength ranges, respectively. The relative absorption properties of the wavelength conversion material over the first wavelength range may be determined as compared to that of the reference conversion material, and the relative emission properties of the wavelength conversion material over the second wavelength range may be determined as compared to that of the reference conversion material.

In some embodiments, the intensity differences may be weighted according to a sensitivity of the human eye over the one or more wavelength ranges, and the optical property may be determined based the weighting of the intensity differences over the one or more wavelengths. For example, a difference function representing the light output of the lighting component as compared to the reference component may be computed based on the relative intensity data, and the intensity differences may be weighted based on a product of the difference function and a luminosity function approximating the sensitivity of the human eye over the one or more wavelength ranges.

In some embodiments, the intensity differences may be correlated to one or more characteristics of the light output of the lighting component that differ from that of the reference component according to the weighting thereof over the one or more wavelength ranges. The intensity differences may be attributed to the element of the lighting component, which may not be included in the reference component.

In some embodiments, the intensity differences at wavelengths between about 500 nm and about 600 nm may be correlated to an increased brightness of the light output of the lighting component relative to that of the reference component. In some embodiments, the intensity differences at wavelengths below about 500 nm may be correlated to a decreased color rendering index (CRI) of the light output of the lighting component without a substantial decrease in brightness relative to that of the reference component.

In some embodiments, respective color coordinates of the reference component may be equal to those of the lighting component up to at least a third decimal place to provide the substantially similar color point.

In some embodiments, the element may be one of a plurality of elements of the lighting component that are not included in the reference component. The intensity differences may be attributed to the element among the plurality of elements of the lighting component based on the one or more wavelength ranges of the intensity differences.

In some embodiments, a light emitting device including the element of the lighting component may be fabricated responsive to determining the optical property thereof. The light emitting device may be configured to provide a desired brightness at a substantially similar color point as the lighting component based on the determined optical property of the element.

In some embodiments, the light emitting device may include a light emitting diode. The light emitting diode may be selected for use in the light emitting device based on the determined optical property of the element.

According to further embodiments of the present invention, a spectral analysis device includes a photodetector interface operable to obtain optical data representative of light output of a lighting component having multiple elements, a memory operable to store the optical data for the lighting component along with reference optical data representative of light output of a reference component, and a processor operable to determine an optical property of an element of the lighting component based on a comparison of the optical data of the lighting component with the reference optical data of the reference component, where the reference component includes at least one reference element.

In some embodiments, the processor may be operable to calculate, from the optical data and the reference optical data, relative intensity data indicative of intensity differences between the light output of the lighting component and that of the reference component, and the comparison may indicate one or more wavelength ranges of the intensity differences.

In some embodiments, the lighting component and the reference component may provide respective light output having a substantially similar color point.

In some embodiments, the element may be a light emitting element, and the optical property may include absorption and/or emission properties of the light emitting element. In addition, the at least one reference element may be a reference light emitting element having known absorption and/or emission properties.

In some embodiments, the light emitting element may be a wavelength conversion material configured to absorb light within a first wavelength range and responsively emit light within a second wavelength range, and the wavelength conversion material may not be included in the reference component.

In some embodiments, the reference light emitting element may be a reference conversion material that is configured to absorb and re-emit light over the first and second wavelength ranges, respectively. The processor may be operable to determine relative absorption and emission properties of the wavelength conversion material as compared to that of the reference conversion material over the first and second wavelength ranges, respectively.

In some embodiments, the processor may be operable to weight the intensity differences according to a sensitivity of the human eye over the one or more wavelength ranges, and to determine the optical property according to the weighting of the intensity differences. For example, the processor may be operable to compute a difference function for the light output of the lighting component based on the relative intensity data, and may be operable to weight the intensity differences based on a product of the difference function and a luminosity function approximating the sensitivity of the human eye over the one or more wavelength ranges. The processor may be further operable to correlate the intensity differences to the one or more characteristics of the light output of the lighting component that differ from that of the reference component according to the weighting thereof over the one or more wavelength ranges, and to attribute the intensity differences to the element of the lighting component that is not included in the reference component.

According to yet further embodiments of the present invention, a method of determining a lighting contribution of a wavelength conversion material of a lighting component includes calculating intensity differences in emission spectra for the lighting component relative to that of a reference component having a substantially similar color point. Differences in optical properties of a wavelength conversion material of the lighting component relative to a wavelength conversion material of the reference component are determined based on one or more wavelength ranges of the intensity differences.

Other methods, systems, and/or apparatus according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION

The present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element such as a layer, region or substrate is referred to as being "on" another element, it can be directly on the other element or intervening elements may also be present. It will be understood that if part of an element, such as a surface, is referred to as "inner," it is farther from the outside of the device than other parts of the element. Furthermore, relative terms such as "beneath" or "overlies" may be used herein to describe a relationship of one layer or region to another layer or region relative to a substrate or base layer as illustrated in the figures. It will be understood that these terms are intended to encompass different orientations of the device in addition to the orientation depicted in the figures. Finally, the term "directly" means that there are no intervening elements. As used herein, the term "and/or" includes any and all combinations of one or more of the associated listed items.

It will also be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-sectional, perspective, and/or plan view illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as a rectangle will, typically, have rounded or curved features due to normal manufacturing tolerances. Thus, the regions illustrated in the figures are schematic in nature and their shapes are not intended to illustrate the precise shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As used herein, the term "semiconductor light emitting device" may include a light emitting diode, laser diode and/or other semiconductor device which includes one or more semiconductor layers, which may include silicon, silicon carbide, gallium nitride and/or other semiconductor materials. A light emitting device may or may not include a substrate such as a sapphire, silicon, silicon carbide, gallium nitride, and/or other microelectronic substrates. A light emitting device may include one or more contact layers which may include metal and/or other conductive layers. The design and fabrication of semiconductor light emitting devices are well known to those having skill in the art and need not be described in detail herein.

For example, the semiconductor light emitting device may be gallium nitride-based LEDs or lasers fabricated on a silicon carbide substrate such as those devices manufactured and sold by Cree, Inc. of Durham, N.C. The present invention may be suitable for use with LEDs and/or lasers as described in U.S. Pat. Nos. 6,201,262; 6,187,606; 6,120,600; 5,912,477; 5,739,554; 5,631,190; 5,604,135; 5,523,589; 5,416,342; 5,393,993; 5,338,944; 5,210,051; 5,027,168; 5,027,168; 4,966,862 and/or 4,918,497. Other suitable LEDs are described in U.S. Pat. No. 6,958,497 entitled "Group III Nitride Based Light Emitting Diode Structures With a Quantum Well and Superlattice, Group III Nitride Based Quantum Well Structures and Group III Nitride Based Superlattice Structures," and U.S. Pat. No. 6,791,119 entitled "Light Emitting Diodes Including Modifications for Light Extraction and Manufacturing Methods Therefor." Furthermore, phosphor coated LEDs, such as those described in U.S. Pat. No. 6,853,010, entitled "Phosphor-Coated Light Emitting Diodes Including Tapered Sidewalls and Fabrication Methods Therefor," may also be suitable for use in embodiments of the present invention. In some embodiments, the LEDs may be configured to operate such that light emission occurs through the substrate. In such embodiments, the substrate may be patterned so as to enhance light output of the devices as is described, for example, in the above-cited U.S. Pat. No. 6,791,119.

The term "phosphor" may be used herein to refer to any materials that absorb light at one wavelength and re-emit light at a different wavelength, regardless of the delay between absorption and re-emission and regardless of the wavelengths involved. Accordingly, the term "phosphor" may refer to wavelength conversion materials that are sometimes called fluorescent and/or phosphorescent. In general, phosphors absorb light having shorter wavelengths and re-emit light having longer wavelengths. As such, some or all of the excitation light emitted by an LED chip at a first wavelength may be absorbed by the phosphor particles, which may responsively emit light at a second wavelength. A fraction of the light may also be reemitted from the phosphor at essentially the same wavelength as the incident light, experiencing little or no down-conversion.

Also, semiconductor nanoparticles, or "quantum dots" (such as ZnS, ZnSe, CdS, and CdSe), may be used as wavelength conversion materials in some embodiments. Quantum dots may offer potential advantages over conventional phosphors as luminescent down-converting materials. For example, the emission spectra of quantum dots can be "tuned" by altering particle size distribution and/or surface chemistry, in contrast to phosphors, where the emission spectra may be fixed by nature. Thus, the term "wavelength conversion material" may be generally used herein to refer to any material or layer containing phosphors, quantum dots, and/or any other material that receives light at one wavelength and responsively re-emits light at a different wavelength.

As used herein, the "efficiency" of a wavelength conversion material may refer to the ratio of the photon output of the material (at any wavelength) relative to the photon input to the material, for example, from the LED chip. In contrast, the "efficacy" of a packaged LED (also referred to herein as a "lighting component" or "component") may refer to the ratio of the overall light output by the LED to the electrical power input to the LED (e.g., in lumens per Watt), which may be affected by the efficiency of the wavelength conversion.

Some embodiments of the present invention provide methods, systems, and apparatus for spectral analysis that may allow a user to determine differences in the properties of wavelength conversion materials and/or other light emitting elements within different lighting components that provide light output having substantially similar color points. A lighting component may be a package including one or more light emitting elements, such as LED chips, wavelength conversion materials, and/or encapsulants, such that the combination of light output from each of the elements may contribute to the overall light output of the lighting component. While discussed herein primarily with reference to white light sources or components, embodiments of the present invention may be similarly applied to components that emit light at other color points.

Embodiments of the present invention may be used to solve problems relating to differences in light output in lighting components that use different wavelength conversion materials, and/or to design wavelength conversion materials to provide increased efficiency, brightness, and/or CRI when used in a specific lighting component based on the properties of the other elements of the lighting component. In particular, some embodiments of the present invention may be used to highlight differences in spectra of components including specifically designed phosphors relative to that of a reference component including a known and/or commercially available phosphor. Such differences may be used to understand the relative differences in brightness and/or CRI of the light output of the components, as well as to determine the absorption and/or emission properties of the specifically designed phosphor.

Figure 1A:
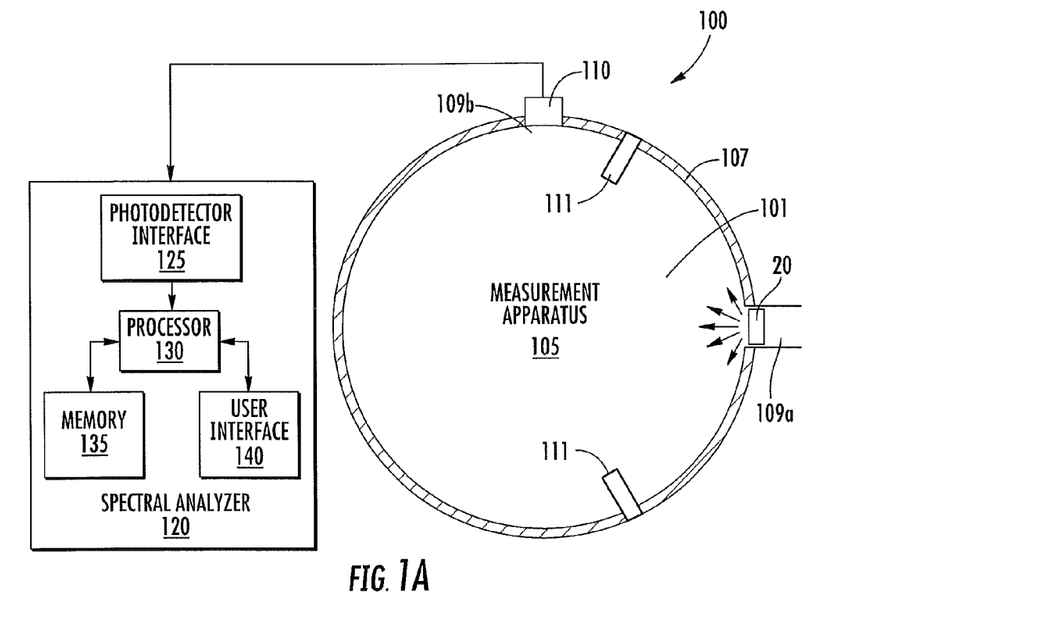
FIG. 1A is a block diagram illustrating methods, systems, and apparatus for determining lighting contributions of elements of a lighting component according to some embodiments of the present invention.

FIG. 1A is a block diagram illustrating methods, systems, and apparatus for determining the lighting contributions of one or more elements of a lighting component according to some embodiments of the present invention. As used herein, the "elements" of a lighting component may refer to the LED chips, wavelength conversion materials, encapsulants, and/or other materials included in the component that contribute to the overall light output. Referring now to FIG. 1A, a system 100 includes a measurement apparatus 105 coupled to a spectral analysis device (or "spectral analyzer") 120. The measurement apparatus 105 is illustrated as an integrating sphere including a hollow cavity 101 having a diffusely reflecting inner surface 107 and openings or ports 109a, 109b therein. A lighting component 20 (also referred to herein as a light source) is provided in the port 109a to introduce light into the apparatus 105, and a photodetector 110 is provided in the port 109b to measure the light emitted by the lighting component 20.

The inner surface 107 of the cavity 101 provides a substantially uniform scattering or diffusing effect on light incident thereon. Accordingly, light rays output from the lighting component 20 that are incident on any point of the inner surface 107 may be distributed substantially equally to all other points on the inner surface 107, including the port 109b in which the photodetector 110 is provided, by multiple scattering reflections. Baffles 111 are provided within the hollow cavity 101 as light barriers to prevent direct illumination of the photodetector 110 by the light output of the lighting component 20. Thus, the light flux as measured by the photodetector 110 may be substantially uniform, and may be independent of spatial and/or polarization properties of the introduced light.

Figure 1B:
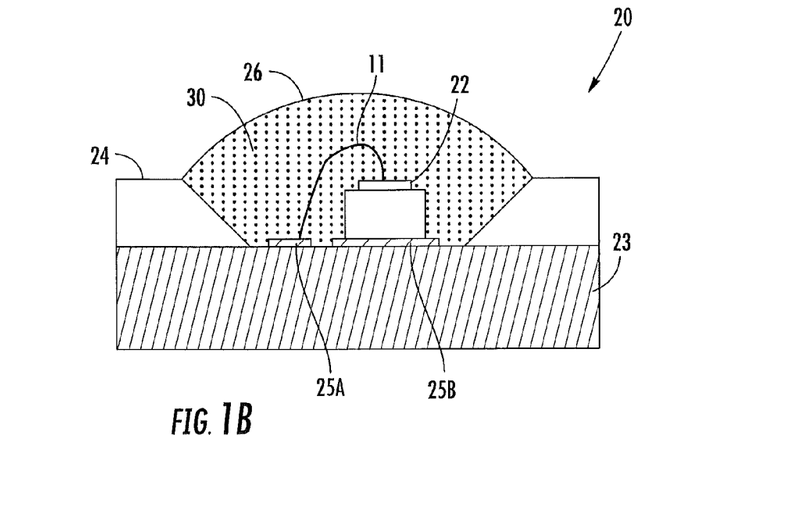
FIG. 1B is a cross-sectional view illustrating an example lighting component according to some embodiments of the present invention.

FIG. 1B illustrates a lighting component 20 according to some embodiments of the present invention in greater detail. The lighting component 20 includes an LED chip 22 mounted on a carrier, such as a printed circuit board (PCB) carrier 23. A metal reflector 24 mounted on the carrier 23 surrounds the LED chip 22 and reflects light emitted by the LED chip 22 away from the component 20. The metal reflector 24 is typically attached to the carrier 23 by means of a solder or epoxy bond. The reflector 24 also provides mechanical protection to the LED chip 22. One or more wirebond connections 11 are made between ohmic contacts on the LED chip 22 and electrical traces 25A, 25B on the carrier 23. The mounted LED chip 22 is covered with an encapsulant 26, which may provide environmental and/or mechanical protection to the chips while also acting as a lens.

The component 20 may also include one or more wavelength conversion elements 30 that absorb at least some of the light emitted by the LED chip 22 (referred to herein as "primary light"), and responsively emit light of a different wavelength (referred to herein as "secondary light") to achieve a desired emission pattern, color and/or intensity. As shown in FIG. 1B, the encapsulant 26 includes the wavelength conversion element(s) 30 therein; however, in some embodiments, the wavelength conversion element(s) 30 and/or other light scattering particles may be provided in one or more layers separate from the encapsulant.

The wavelength conversion element(s) 30 need not absorb all of the primary light from the LED chip 22, and may be selected for use in the component 20 based on their particular absorption and/or emission properties in combination with the characteristics of the light output of the LED chip 22 to increase and/or maximize the overall light emission of the component 20 at a desired wavelength or wavelengths. The wavelength conversion element(s) 30 may also be selected based on the efficiency thereof and/or to provide a desired overall efficiency for the component 20. The absorption and/or emission properties of the wavelength conversion element(s) 30 may be determined by the spectral analyzer 120 in accordance with some embodiments of the present invention as discussed below.

Referring again to FIG. 1A, the spectral analyzer 120 includes a photodetector interface 125 operable to receive or obtain emission data from the photodetector 110, a memory 135 operable to store the emission data received from the photodetector 110 and/or other emission data, a user interface 140, and a processor 130 coupled to the photodetector interface 125, the memory 135, and the user interface 140. The processor 130 is operable to control the overall operations of the spectral analyzer 120. For example, the processor 130 may be a commercially available or custom microprocessor that is configured to automatically perform the spectral analysis operations described herein responsive to receiving emission data via the photodetector interface 125. The memory 135 may be embodied in volatile and/or nonvolatile memory, such as flash, magnetic, and/or optical rewritable nonvolatile memory. The user interface 140 may include a display, a keyboard/keypad, a touch-sensitive display, and/or other input/output devices operable to receive inputs from and/or present outputs to a user.

Referring now to FIGS. 1A and 1B, the lighting component 20 is activated to emit light, which is measured by the photodetector 110 based on multiple scattering reflections on the inner surface 107 of the apparatus 105. The photodetector 110 outputs a measurement signal including emission data representative of the light output of the component 20 to the photodetector interface 125 of the spectral analyzer 120, which provides the received emission data to the processor 130. From the emission data, the processor 130 calculates relative intensity data for the light output of the component 20 relative to light output of a reference lighting component (not shown). In particular, reference emission data representative of the light output of the reference lighting component may be stored in the memory 135 based on known characteristics and/or previous measurements of the light output from the reference component. For example, in some embodiments, the measurement apparatus 105 may be used to measure the light output of a reference lighting component including one or more light emitting elements having known properties or characteristics, and the photodetector 110 may output emission data indicative of the light output of the reference component to the photodetector interface 125 for storage in the memory 135. The relative intensity data computed by the processor 130 may thereby indicate intensity differences in the light output of the component 20 as compared to that of the reference component.

The reference component may be similar in configuration to and may have a substantially similar color point as the lighting component 20, but may differ with respect to one or more light emitting elements included therein. In particular, the reference component may be selected for comparison purposes based on a similarity of the color coordinates of the light output therefrom to that of the lighting component 20. For example, as a human eye may be capable of detecting differences in color coordinates up to about the fourth decimal place, a reference component having respective color coordinates (CCx, CCy) that are equal to those of the lighting component up to at least a third decimal place (with reference to a CIE 1931 chromaticity diagram) may be selected for comparison purposes.

Based on one or more wavelength ranges of the intensity differences and knowledge of the properties of one or more of the elements of the reference component, the processor 130 is configured to determine absorption and/or emission properties of at least one element of the component 20. For example, the component 20 may include a particular wavelength conversion material 30 that is not included in the reference component, and the processor 130 may attribute the intensity differences to that wavelength conversion material 30. The processor 130 may thereby determine relative absorption and/or emission properties of the wavelength conversion material 30 as compared to a wavelength conversion material of the reference component based on the wavelength range(s) at which the relative intensity data for the lighting component 20 and the reference component differ. For example, the wavelength conversion material 30 may be a red-emitting phosphor (e.g., a phosphor configured to emit light in the red wavelength range of about 600 nm to about 720 nm) in some embodiments, and the reference component may include a red-emitting phosphor of a different material. As such, if the intensity differences occur in a yellow wavelength range (e.g., about 570 nm to about 590 nm), but both the lighting component 20 and the reference component include a yellow-emitting phosphor (e.g., a phosphor configured to emit light in the yellow wavelength) of the same or similar specification, the processor 130 may determine that the wavelength conversion material 30 is absorbing more or less of the yellow light than a red-emitting phosphor of the reference component.

The processor 130 may also correlate the intensity differences to one or more characteristics of the light output of the component 20 (such as brightness and/or CRI) according to the wavelength range(s) of the intensity differences relative to the sensitivity of a human eye over the wavelength range(s). For instance, the processor 130 may be configured to weight the relative intensity data for the component 20 according to a proximity of the wavelength range(s) thereof to 555 nm, such that greater weight is given to intensity differences at wavelengths closer to 555 nm. In some embodiments, the processor may weight the relative intensity data using a luminosity function representing the average sensitivity of the human eye.

The processor 130 is further configured to present the determined absorption and/or emission properties of the wavelength conversion material 30 of the component 20 via the user interface 140. For example, the determined properties may be presented on the user interface 140 as one or more of the charts and graphs shown by way of example in FIGS. 4A-4E and/or 5A-5E. Based on the determined properties, a solid state lighting component including the wavelength conversion material 30 may be fabricated. For example, responsive to determining that the wavelength conversion material 30 absorbs less yellow light than the red-emitting phosphor of the reference component, a new solid state lighting component may be fabricated that provides improved brightness (due to less absorption of the yellow light near the wavelength range of highest eye sensitivity) at a substantially similar color point as compared to the reference component. Other elements (such as LED chips and/or other wavelength conversion materials) may also be selected'for use in the new solid state lighting component based on their respective absorption/emission properties in combination with the determined absorption and/or emission properties for the wavelength conversion material 30. Moreover, while discussed above primarily with reference to determining absorption and/or emission properties of the wavelength conversion material 30, it will be understood that embodiments of the present invention may be used to determine properties of any of the other light emitting elements included in a lighting component for use in the design and/or fabrication of solid state lighting devices.

Figure 2:
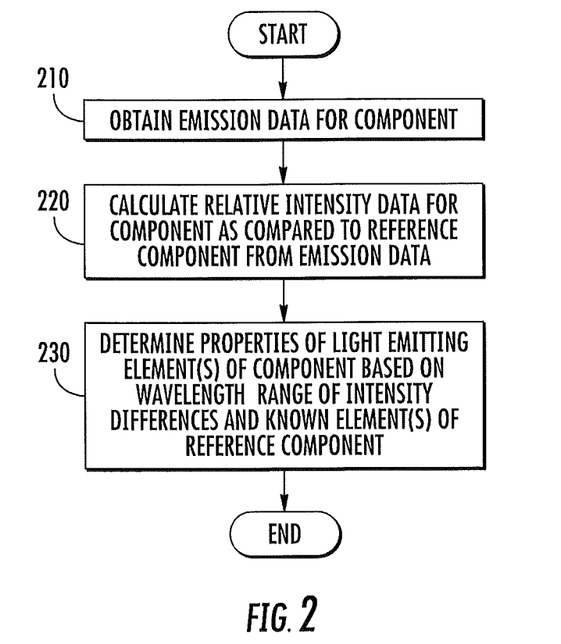
FIG. 2 is a flowchart illustrating operations for determining lighting contributions of elements of a lighting component according to some embodiments of the present invention.

FIG. 2 is a flowchart illustrating methods for determining lighting contributions of elements of a lighting component according to some embodiments of the present invention. One or more of the operations illustrated in FIG. 2 may be performed by the spectral analyzer 120 of FIG. 1A and/or modules thereof. Referring now to FIG. 2, emission data representative of light output of the lighting component is obtained (block 210). For example, the emission data may be obtained from measurements of the light output of the component using an integrating sphere and/or a spectral analyzer as described above with reference to FIG. 1A.

From the emission data, relative intensity data indicative of intensity differences in the light output of the lighting component as compared to that of a reference component having a substantially similar color point is calculated (block 220). For example, a difference function representing the differences in the light output of the lighting component relative to that of the reference component may be computed from the measured emission data of the lighting component and previously measured or known reference emission data for the reference component, and may be plotted with reference to a luminosity function representing the sensitivity of a human eye.

Based on a wavelength range of the intensity differences, as well as knowledge of at least one element of the reference component, absorption and/or emission properties of at least one element of the lighting component is determined (block 230). For instance, where the lighting component and the reference component each include a blue-emitting LED chip of similar specification and a yellow-emitting phosphor of a different composition, an increased intensity of the lighting component as compared to that of the reference component over a particular wavelength range may be attributed to the yellow-emitting phosphor of the lighting component. As such, it may be determined that the yellow-emitting phosphor of the lighting component may emit more or less yellow light responsive to excitation of the light provided by the respective blue-emitting LED chip than the yellow-emitting phosphor of the reference component, and thus, may offer improved or reduced efficiency. The determined emission properties of the element(s) of the lighting component may be used to improve phosphor design and/or selection of LED chips and phosphor combinations for use in lighting components, as discussed in detail above with reference to FIGS. 1A-1B.

Figure 3:
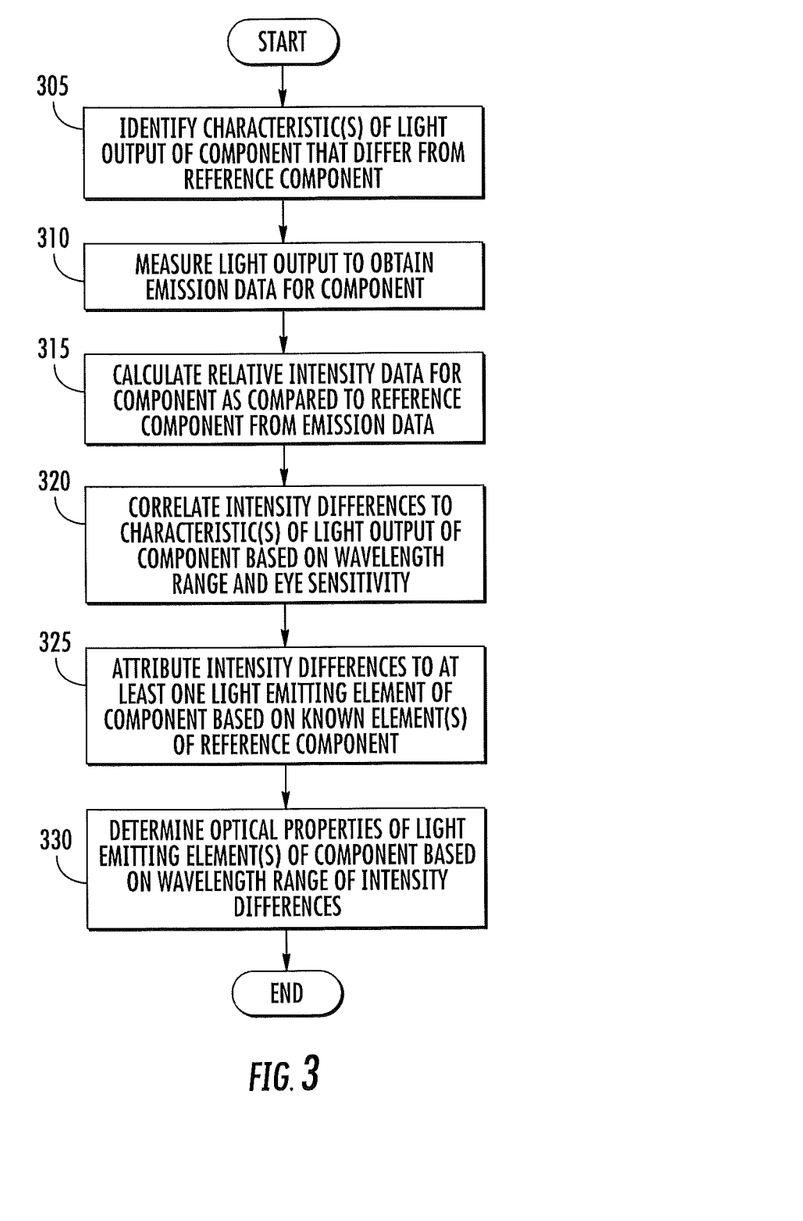
FIG. 3 is a flowchart illustrating operations for determining lighting contributions of elements of a lighting component according to further embodiments of the present invention.

FIG. 3 is a flowchart illustrating methods for determining lighting contributions of elements of a lighting component according to some embodiments in greater detail. Referring now to FIG. 3, when comparing the light output of a lighting component with that of a reference component, one or more characteristics of the light output of the lighting component that differs from that of the reference component are identified (block 305). For example, the light output provided by lighting component may differ in brightness and/or CRI when compared to the reference component having a substantially similar color point. The light output of the lighting component is thereby measured to obtain emission data representative of the intensity of the light output (block 310). For instance, the emission data may be obtained by using an integrating sphere to measure the light output of the lighting component, as discussed above with reference to FIGS. 1A-1B. Reference emission data representative of the intensity of the light output of the reference component may be similarly obtained.

Relative intensity data for the lighting component as compared to the reference component is calculated from the emission data (block 315). In some embodiments, the relative intensity data may be calculated using the equation:

$$\frac{\text{measured intensity of lighting component}}{\text{intensity of reference component}} - 1 = \text{relative intensity}$$

for each wavelength of interest. The relative intensity data is thereby indicative of intensity differences in the light output of the lighting component relative to that of the reference component at the same wavelength(s). Accordingly, a difference function representing the intensity differences may be computed from the relative intensity data over the wavelengths of visible light (e.g., from about 390 nm to about 750 nm).

Still referring to FIG. 3, the intensity differences are correlated to the one or more characteristics of the light output of the component according to a wavelength range of the intensity differences and a sensitivity of a human eye over the wavelength range of the intensity differences (block 320). In particular, the intensity differences may be weighted according to proximity of the corresponding wavelength to a wavelength range where the human eye is most sensitive, for example, as approximated by a luminosity function. As such, the intensity differences may be weighted based on their proximity to about 555 nanometers (nm), such that a greater weight is given to intensity differences at wavelengths closer to 555 nm. Thus, intensity differences occurring in the 500 nm to 600 nm wavelength range may be correlated to a difference in the brightness of the lighting component as compared to the reference component. In some embodiments, the difference function for the lighting component may be computed from the relative intensity data, and the intensity differences may be weighted based on a product of the difference function and a luminosity function that approximates the sensitivity of the human eye.

The intensity differences are attributed to one or more elements of the lighting component based on at least one known element of the reference component (block 325). In some embodiments, all elements of the reference component may be known, and the intensity differences may be attributed to one or more elements of the lighting component that are not included in the reference component. In some embodiments, the intensity differences may be attributed to a particular one of the elements of the lighting component based on the wavelength range(s) of the intensity differences. Accordingly, based on the wavelength range of the intensity differences and the known element(s) of the reference component, optical properties (such as light absorption and/or emission properties) of the element(s) of the lighting component may be determined (block 330). For example, if the intensity differences occur in a yellow wavelength range (e.g., about 570 nm to about 590 nm), but both the lighting component and the reference component include a yellow-emitting phosphor of similar specification, it may be determined that a phosphor of the lighting component that is not included in the reference component is absorbing more or less of the yellow light.

Determination of such absorption and/or emission properties are discussed in greater detail below with reference to FIGS. 4A-4E and 5A-5E.

Figure 4A:
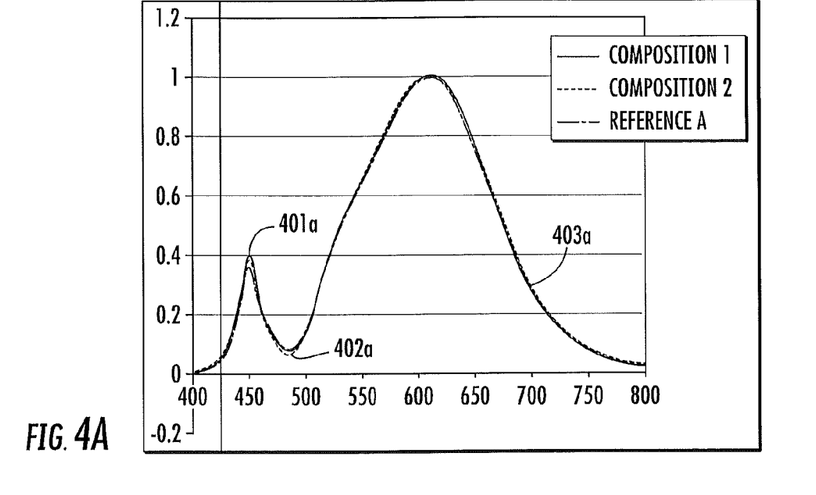
FIGS. 4A to 4E are graphs and charts for use in determining lighting contributions of elements of a lighting component in accordance with some embodiments of the present invention.
Figure 4B:
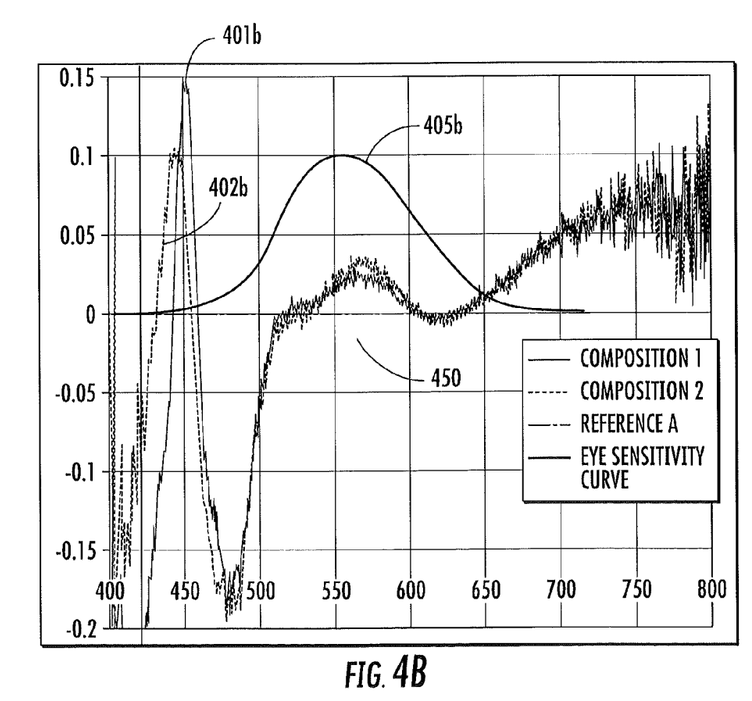
Figure 4C:
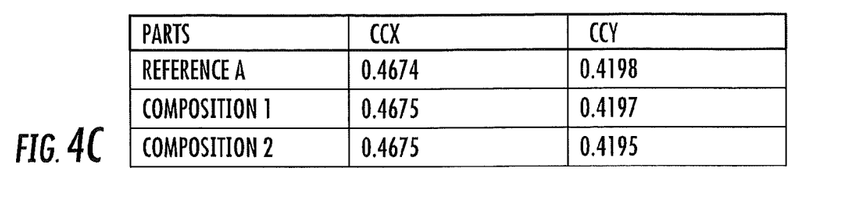
Figure 4D:
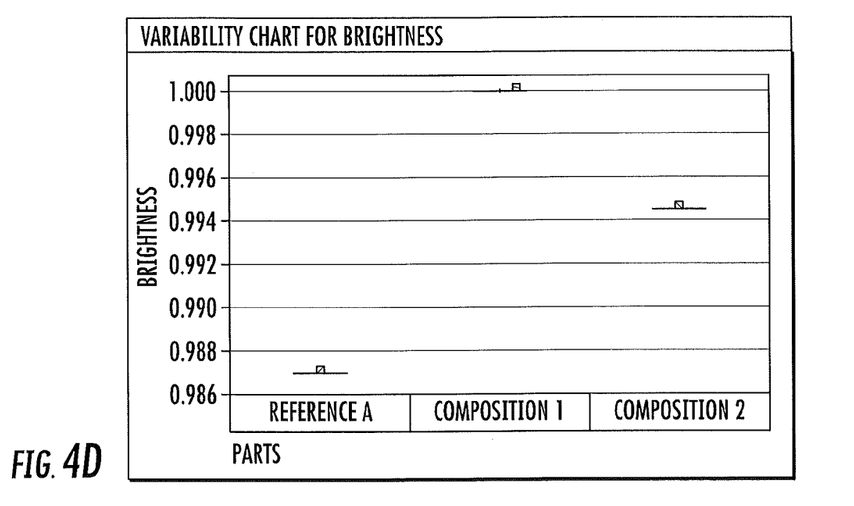
Figure 4E:
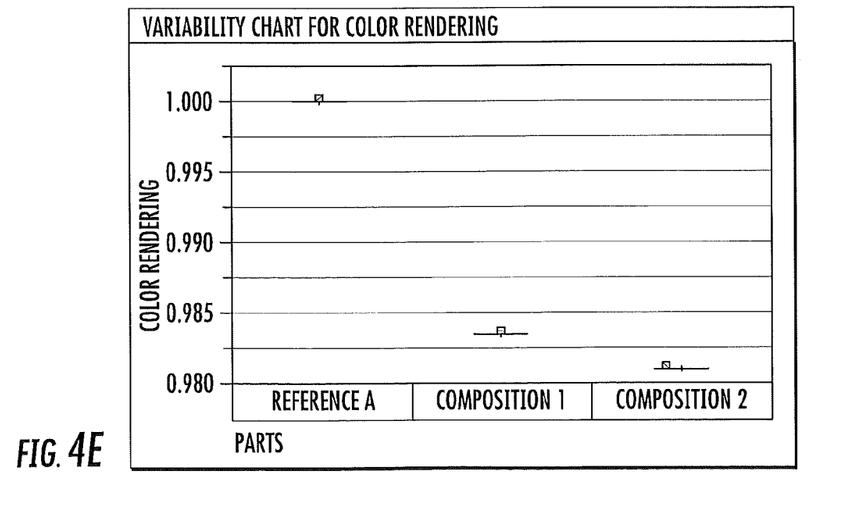

FIGS. 4A-4E illustrate experimental results with respect to the light output of three components (referred to herein as "component 1," "component 2," and "reference A") with substantially similar color points. In particular, the chart of FIG. 4C illustrates that reference A, component 1, and component 2 all have similar color coordinates (CCx, CCy), e.g., the respective x-color coordinates are equal up to at least the third decimal place, and the respective y-color coordinates are equal up to at least the third decimal place. Each of the components includes a blue LED chip of the same or similar specification and a yellow-emitting phosphor of the same or similar specification; however, each of the components includes a different red-emitting phosphor. As shown in FIGS. 4D and 4E, components 1 and 2 have improved brightness (FIG. 4D) but reduced CRI (FIG. 4E) as compared to reference A. The relative differences in brightness and CRI of FIGS. 4D and 4E were measured from the light output of component 1 and component 2 in comparison with that of reference A using industry accepted methods.

Spectral analysis methods according to some embodiments of the present invention may be used to explain the differences in the light outputs of component 1, component 2, and reference A (as illustrated in FIGS. 4D and 4E), despite the similar color coordinates of the three components (as illustrated in FIG. 4C). In particular, emission spectra for each of the components were obtained using industry accepted methods (for example, based on measurements using an integrating sphere as illustrated in FIG. 1A). The normalized emission spectra for each of the three components are shown (overlaid) in the graph of FIG. 4A, where line 401a illustrates the emission spectra for component 1, line 402a illustrates the emission spectra for component 2, and line 403a illustrates the reference emission spectra for reference A. Relative intensity data for the components 1 and 2 as compared to the reference component was then calculated from the emission data using the formula:

$$\frac{component_z\ intensity_x}{reference\ component\ intensity_x} - 1 = \text{relative intensity of } component_z$$

for each wavelength of interest x, where z=1, 2.

As shown in FIG. 4B, the resulting relative intensity data for each component 1 and 2 are plotted as difference functions 401b and 402b, which indicate differences in the light output of component 1 and component 2 relative to that of reference A. A luminosity function 405b, which approximates the sensitivity of a human eye, is also plotted in FIG. 4B. Accordingly, FIG. 4B illustrates that the light output of components 1 and 2 have increased intensities in the area 450 between about 525 nm and 600 nm as compared to reference A, as shown by the difference functions 401b and 402b over this wavelength range. As these intensity differences occur near a peak of the luminosity function 405b, the intensity differences over the wavelength range of about 525 nm to about 600 nm can be correlated to the increased brightness of the light output of components 1 and 2 as compared to reference A, as shown in FIG. 4D.

FIG. 4B also illustrates that the light output of components 1 and 2 have decreased intensities between about 460 nm and 525 nm as compared to reference A, as shown by the difference functions 401b and 402b over this wavelength range. However, as these intensity differences occur in a wavelength range of low eye sensitivity (as indicated by the luminosity function 405b), they can be indicative of the decrease in overall CRI of the light output of components 1 and 2 relative to that of reference A (as shown in FIG. 4E), without a substantial decrease in brightness (as shown in FIG. 4D). Likewise, FIG. 4B illustrates a significant intensity difference in the light output of components 1 and 2 between about 425 nm and 460 nm, which may be indicative of the increased brightness of component 1 as compared to that of component 2 (as shown in FIG. 4D).

Accordingly, the spectral analysis operations described above with reference to FIGS. 4A and 4B can be used to explain the relative differences in brightness between component 1, component 2, and the reference component A, when considered along with the differences in the compositions of the three components. In particular, FIG. 4B illustrates that the yellow emission of components 1 and 2 is greater than that of reference A, based on the intensity differences 450 in the wavelength range of about 525 nm to about 600 nm. However, as all three components include a same or similar blue-emitting LED chip and a same or similar yellow-emitting phosphor, it can be determined that the interaction of the red-emitting phosphors of components 1 and 2 with their respective yellow-emitting phosphors results in an increase in yellow light output as compared to the red-emitting phosphor of reference A. In particular, it can be determined that the red-emitting phosphors of components 1 and 2 absorb less of the light emitted by the yellow-emitting phosphor than the red-emitting phosphor of reference A. Thus, the red-emitting phosphors of components 1 and 2 may provide improved brightness as compared to the red-emitting phosphor of reference A (due to less absorption of light in the wavelength range of greater eye sensitivity), without a significant decrease in CRI (as the decreased intensity occurs in a wavelength range of lesser eye sensitivity).

Figure 5A:
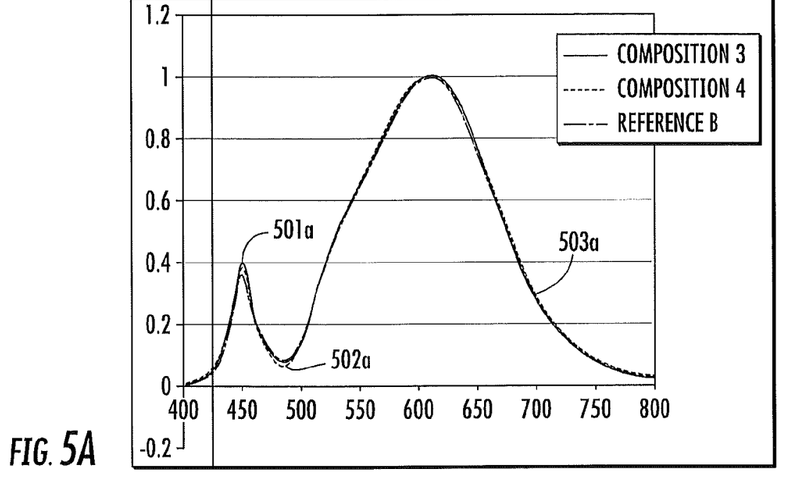
FIGS. 5A to 5E are graphs and charts for use in determining lighting contributions of elements of a lighting component in accordance with some embodiments of the present invention.
Figure 5B:
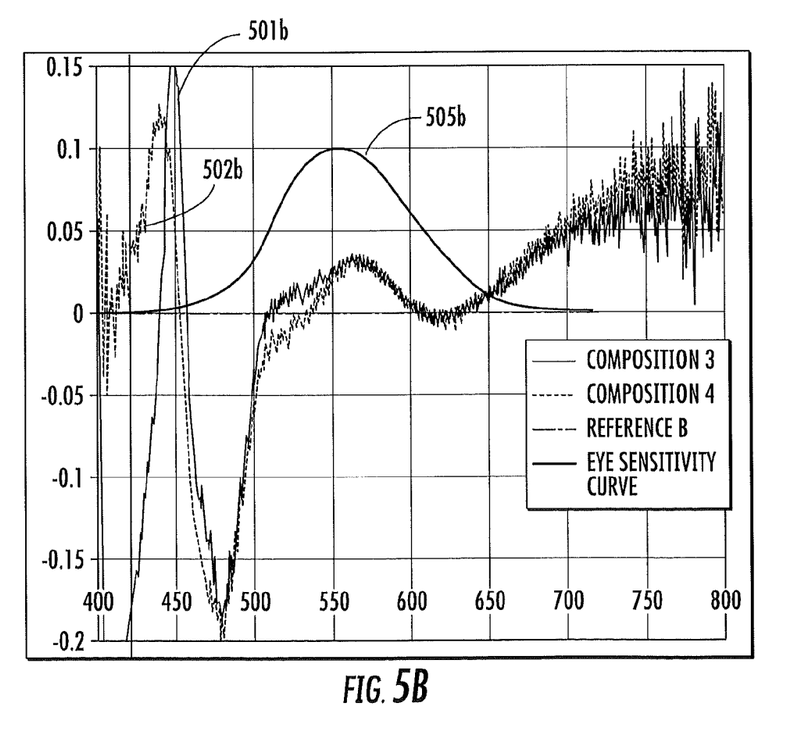
Figure 5C:
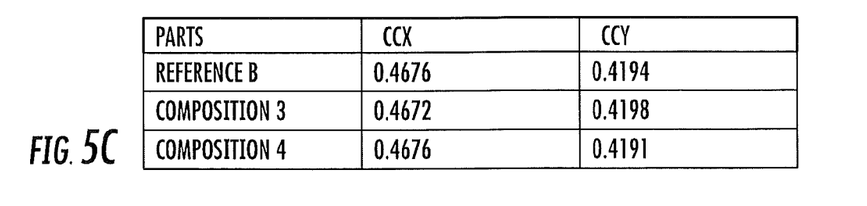
Figure 5D:
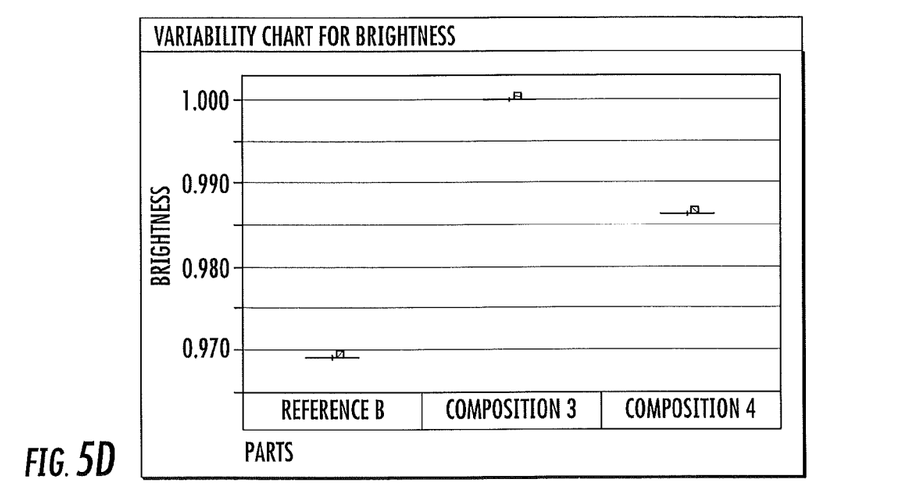
Figure 5E:
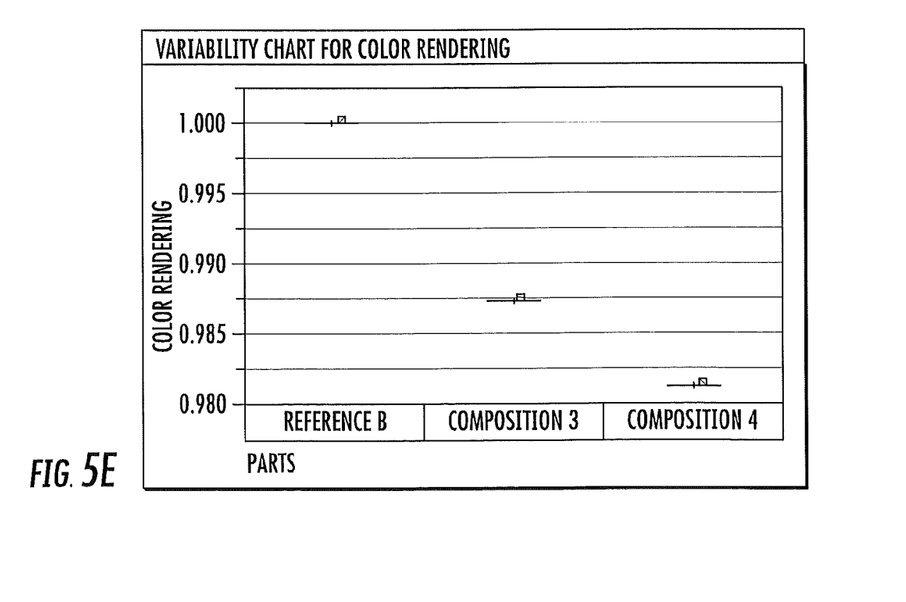

FIGS. 5A-5E illustrate additional experimental results with respect to the light output of three components (referred to herein as "component 3," "component 4," and "reference B") with substantially similar color points. In particular, the chart of FIG. 5C illustrates that reference B, component 3, and component 4 all have similar color coordinates (CCx, CCy), where each of the components includes a blue LED chip of the same or similar specification and a yellow-emitting phosphor of the same or similar specification, but each of the components includes a different red-emitting phosphor. As shown in FIGS. 5D and 5E, components 3 and 4 have improved brightness (FIG. 5D) but reduced CRI (FIG. 5E) as compared to reference B, as measured using industry accepted methods.

Spectral analysis methods according to some embodiments of the present invention may be used to explain the differences in the light outputs of component 3, component 4, and reference B (as illustrated in FIGS. 5D and 5E), despite the similar color coordinates of the three components (as illustrated in FIG. 5C). In particular, emission spectra for each of the components was obtained using industry accepted methods, and the normalized emission spectra for each of the three components are shown (overlaid) in the graph of FIG. 5A, where line 501a illustrates the emission spectra for component 3, line 502a illustrates the emission spectra for component 4, and line 503a illustrates the reference emission spectra for reference B. Relative intensity data for the components 3 and 4 relative to reference B was calculated from the emission data using the formula discussed above with reference to FIGS. 4A-4E, and plotted in FIG. 5B.

As shown in FIG. 5B, the resulting relative intensity data for each component 3 and 4 are plotted as difference functions

501*b* and 502*b*, which indicate differences in the light output of component 3 and component 4 relative to that of reference B. A luminosity function 505*b* approximating the sensitivity of a human eye is also plotted in FIG. 5B. Accordingly, FIG. 5B illustrates that the light output of component 3 has an increased intensity between about 510 nm and 600 nm, and that the light output of component 4 has an increased intensity between about 540 nm and 600 nm, as compared to reference B. These intensity differences can be correlated to the increased brightness of the light output of components 3 and 4 as compared to reference B (as shown in FIG. 5D), based on the proximity of the intensity differences to the peak of the luminosity function 505*b*.

FIG. 5B also illustrates that the light output of components 3 and 4 have reduced intensities between about 460 nm and 510 nm and between about 460 nm and 540 nm, respectively, as shown by the difference functions 501*b* and 502*b* over these wavelength ranges. However, as the reduced intensities occur in a wavelength range of relatively low eye sensitivity (as indicated by the luminosity function 505*b*), these intensity differences can be correlated to the reduced CRI of the light output of components 3 and 4 as compared to reference B (as shown in FIG. 5E), without a substantial reduction in brightness (as shown in FIG. 5D). Likewise, FIG. 5B illustrates intensity differences between the light output of components 3 and 4 between about 400 nm and 460 nm, which may be correlated to the increased brightness of component 3 as compared to that of component 4 (as shown in FIG. 4D) based on the eye sensitivity over this wavelength range indicated by the luminosity function 505*b*.

Based on the wavelength ranges of the intensity differences shown in FIG. 5B, absorption and/or emission properties of the red emitting phosphors of components 3 and 4 relative to the red-emitting phosphor of reference B can be determined, as similarly discussed above with reference to FIG. 4B. In particular, as all three components include a blue-emitting LED chip of the same or similar specification and a yellow-emitting phosphor of the same or similar specification, it can be determined that the interaction of the red-emitting phosphors of components 3 and 4 with their respective yellow-emitting phosphors results in less absorption of yellow light as compared to the red-emitting phosphor of the reference component, thereby resulting in improved brightness without significant degradation in CRI.

Accordingly, embodiments of the present invention may provide an understanding of the contribution of a wavelength conversion material and/or other light emitting element to differences in lighting characteristics (such as brightness and/or CRI) of components that emit light having similar color points. Embodiments of the present invention may be used not only in the design of wavelength conversion materials, but also in analysis and evaluation of such materials. For example, some embodiments may be used in evaluating the properties of currently known phosphors when used in newly designed components. Additionally, the specifically designed phosphor examples described herein may be selected for use in newly-designed and/or current phosphor-containing components based on the properties thereof.

The present invention is described above with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, and a portable disc-based read-only memory (CD-ROM/DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module," "an engine," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

While the above embodiments are described with reference to particular figures, it is to be understood that embodiments of the present invention may include additional and/or intervening layers or structures, and/or particular layers or structures may be deleted. More generally, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the That which is claimed:

1. A method of determining lighting contributions of elements of a solid state lighting component, the method comprising:
   obtaining optical data representative of light output of a solid state lighting component including multiple elements; and
   determining an optical property of an element of the solid state lighting component based on one or more wavelength ranges indicated by a comparison of the optical data of the solid state lighting component relative to that of a reference component including at least one reference element.

2. The method of claim 1, further comprising:
   calculating, from the optical data, relative intensity data indicative of intensity differences between the light output of the lighting component and that of the reference component,
   wherein the comparison indicates the one or more wavelength ranges of the intensity differences.

3. The method of claim 2, wherein the lighting component and the reference component provide respective light output having a substantially similar color point.

4. The method of claim 3, wherein the element comprises a light emitting element, and wherein the optical property comprises absorption and/or emission properties of the light emitting element.

5. The method of claim 4, wherein the at least one reference element comprises a reference light emitting element having known absorption and/or emission properties.

6. The method of claim 5, wherein the light emitting element comprises a wavelength conversion material configured to absorb light within a first wavelength range and responsively emit light within a second wavelength range, and wherein the wavelength conversion material is not included in the reference component.

7. The method of claim 6, wherein the reference light emitting element comprises a reference conversion material that is configured to absorb and re-emit light over the first and second wavelength ranges, respectively, and wherein determining the optical property comprises:
   determining relative absorption and emission properties of the wavelength conversion material as compared to that of the reference conversion material over the first and second wavelength ranges, respectively.

8. The method of claim 2, further comprising:
   weighting the intensity differences according to a sensitivity of the human eye over the one or more wavelength ranges,
   wherein determining the optical property comprises determining the optical property according to the weighting of the intensity differences.

9. The method of claim 8, further comprising:
   correlating the intensity differences to one or more characteristics of the light output of the lighting component that differ from that of the reference component according to the weighting thereof over the one or more wavelength ranges; and
   attributing the intensity differences to the element of the lighting component, wherein the element is not included in the reference component.

10. The method of claim 8, wherein:
    calculating the relative intensity data further comprises computing a difference function for the light output of the lighting component based on the relative intensity data; and
    weighting the intensity differences comprises weighting the intensity differences based on a product of the difference function and a luminosity function approximating the sensitivity of the human eye over the one or more wavelength ranges.

11. The method of claim 9, wherein correlating comprises:
    correlating the intensity differences at wavelengths between about 500 nm and about 600 nm to an increased brightness of the light output of the lighting component relative to that of the reference component.

12. The method of claim 9, wherein correlating comprises:
    correlating the intensity differences at wavelengths below about 500 nm to a decreased color rendering index (CRI) of the light output of the lighting component without a substantial decrease in brightness relative to that of the reference component.

13. The method of claim 3, wherein respective color coordinates of the reference component are equal those of the lighting component up to at least a third decimal place to provide the substantially similar color point.

14. The method of claim 2, wherein the element comprises one of a plurality of elements of the lighting component that are not included in the reference component, and further comprising:
    attributing the intensity differences to the element among the plurality of elements based on the one or more wavelength ranges of the intensity differences.

15. The method of claim 1, further comprising:
    fabricating a light emitting device including the element of the lighting component responsive to determining the optical property thereof,
    wherein the light emitting device is configured to provide a desired brightness at a substantially similar color point as the lighting component based on the determined optical property of the element.

16. The method of claim 15, wherein the light emitting device includes a light emitting diode, and further comprising:
    selecting the light emitting diode for use in the light emitting device based on the determined optical property of the element.

17. A spectral analysis device, comprising:
    a photodetector interface operable to obtain optical data representative of light output of a solid state lighting component including multiple elements;
    a memory operable to store the optical data for the solid state lighting component and reference optical data representative of light output of a reference component including at least one reference element; and
    a processor operable to determine an optical property of an element of the solid state lighting component based on one or more wavelength ranges indicated by a comparison of the optical data with the reference optical data.

18. The device of claim 17, wherein the processor is operable to calculate, from the optical data and the reference optical data, relative intensity data indicative of intensity differences between the light output of the lighting component and that of the reference component, and wherein the comparison indicates the one or more wavelength ranges of the intensity differences.

19. The device of claim 18, wherein the lighting component and the reference component provide respective light output having a substantially similar color point.

20. The device of claim 19, wherein the element comprises a light emitting element, and wherein the optical property comprises absorption and/or emission properties of the light emitting element.

21. The device of claim 20, wherein the at least one reference element comprises a reference light emitting element having known absorption and/or emission properties.

22. The device of claim 21, wherein the light emitting element comprises a wavelength conversion material configured to absorb light within a first wavelength range and responsively emit light within a second wavelength range, and wherein the wavelength conversion material is not included in the reference component.

23. The device of claim 22, wherein the reference light emitting element comprises a reference conversion material that is configured to absorb and re-emit light over the first and second wavelength ranges, and wherein the processor is operable to determine relative absorption and emission properties of the wavelength conversion material as compared to that of the reference conversion material over the first and second wavelength ranges, respectively.

24. The device of claim 18, wherein the processor is further operable to weight the intensity differences according to a sensitivity of the human eye over the one or more wavelength ranges, and to determine the optical property according to the weighting of the intensity differences.

25. The device of claim 24, wherein the element is not included in the reference component, and wherein the processor is further operable to correlate the intensity differences to one or more characteristics of the light output of the lighting component that differ from that of the reference component according to the weighting thereof over the one or more wavelength ranges, and to attribute the intensity differences to the element of the lighting component.

26. The device of claim 24, wherein the processor is operable to compute a difference function for the light output of the lighting component based on the relative intensity data, and is operable to weight the intensity differences based on a product of the difference function and a luminosity function approximating the sensitivity of the human eye over the one or more wavelength ranges.

27. A method of determining a lighting contribution of a wavelength conversion material of a lighting component, the method comprising:
calculating intensity differences in emission spectra for the lighting component relative to that of a reference component having a substantially similar color point; and
determining differences in optical properties of the wavelength conversion material independent of the lighting component relative to a wavelength conversion material of the reference component based on one or more wavelength ranges of the intensity differences.

28. The method of claim 27, wherein calculating the intensity differences comprises:
obtaining the emission spectra for each of the lighting component and the reference component;
computing a difference function indicative of the intensity differences in the emission spectra of the lighting component as compared to that of the reference component; and
weighting the intensity differences based on a product of the difference function and a luminosity function approximating a sensitivity of a human eye over the one or more wavelength ranges.

29. The method of claim 28, further comprising:
correlating the intensity differences to one or more characteristics of light output of the lighting component according to the weighting thereof over the one or more wavelength ranges.

30. A method, comprising:
receiving a signal including emission data for a solid state lighting component comprising multiple light emitting elements;
calculating relative data indicative of differences between the received emission data and reference emission data over a visible wavelength range; and
determining an optical property of one of the light emitting elements of the solid state lighting component based on one or more wavelength ranges within the visible wavelength range corresponding to the differences.

31. The method of claim 30, wherein determining comprises:
weighting the differences according to a sensitivity of the human eye over the one or more wavelength ranges;
correlating the differences to one or more characteristics of light output of the lighting component that differ from that indicated by the reference emission data according to the weighting thereof over the one or more wavelength ranges; and
attributing the one or more characteristics of the light output to one of the light emitting elements of the lighting component based on the one or more wavelength ranges corresponding to the differences.

32. The method of claim 31, wherein:
calculating comprises computing a difference function for the lighting component based on the differences over the visible wavelength range; and
weighting comprises weighting the differences based on a product of the difference function and a luminosity function approximating the sensitivity of the human eye over the one or more wavelength ranges.

* * * * *